United States Patent [19]

Iwahashi et al.

[11] Patent Number: 4,802,044
[45] Date of Patent: Jan. 31, 1989

[54] MOUNTING ARRANGEMENTS FOR LEVY SPRINGS ACTING AGAINST TAPE REELS IN A CASSETTE

[75] Inventors: Yuuji Iwahashi; Kiyoshi Urayama, both of Miyagi, Japan

[73] Assignee: Sony Corp., Tokyo, Japan

[21] Appl. No.: 929,283

[22] Filed: Nov. 12, 1986

[30] Foreign Application Priority Data

Nov. 21, 1985 [JP] Japan .......................... 60-179514[U]

[51] Int. Cl.$^4$ .............................................. G11B 23/02
[52] U.S. Cl. .................................... 360/132; 242/199
[58] Field of Search .......... 360/93, 96.1, 132, 130.32, 360/130.33; 206/387; 242/197, 199; 267/158, 160; 411/501, 507, 545; 403/274

[56] References Cited

U.S. PATENT DOCUMENTS

| | | | |
|---|---|---|---|
| 1,481,515 | 1/1924 | Kraft | 411/54 S |
| 3,419,297 | 12/1968 | Diepenhorst et al. | 411/501 X |
| 3,526,032 | 9/1970 | Pipher | 411/507 X |
| 3,531,850 | 10/1970 | Durand | 403/274 X |
| 4,428,547 | 1/1984 | Gotoh | 242/199 |
| 4,687,157 | 8/1987 | Schoettle et al. | 242/199 |

FOREIGN PATENT DOCUMENTS 61199286 9/1986 Japan .................................. 360/132

OTHER PUBLICATIONS

Ansell et al., "Star Washer Fasteners," IBM Tech. Disc. Bull., vol. 27, No. 4B, Sep., 1984.

Primary Examiner—John H. Wolff
Attorney, Agent, or Firm—Alvin Sinderbrand, Curtis, Morris & Safford

[57] ABSTRACT

In a tape cassette having supply and take-up reels on which a tape extending between the reels is wound, a cassette housing containing the reels, leaf springs for urging the reels toward the lower portion of the housing, and headed pins depending from an upper portion of the housing through holes in the leaf springs for mounting the latter; each leaf spring has a surface portion adjacent the respective hole formed with fine convex and concave irregularities and being engaged by the respective headed pin for securely holding the leaf springs against turning and wobbling about the headed pins.

4 Claims, 4 Drawing Sheets

MOUNTING ARRANGEMENTS FOR LEVY SPRINGS ACTING AGAINST TAPE REELS IN A CASSETTE

BACKGROUND OF THE INVENTION

1. Field of the Invention

The present invention relates generally to tape cassettes, such as, those intended for use in video tape recorders and other types of information processing apparatus, and more particularly is directed to improvements in the structures by which supply and take-up reels are positioned within the cassette housing.

2. Description of the Prior Art

As shown on FIGS. 1-3, a conventional tape cassette 1 for use in a video tape recorder (VTR) generally comprises a cassette housing or casing 2 formed by mutually connecting upper and lower housing portions 3 and 4, respectively, molded of a synthetic resin. The conventional tape cassette 1 further includes a front cover or lid 5, also molded of synthetic resin, and hingedly connected to the cassette housing 2 so as to be movable between opened and closed positions. A supply reel 6 and a take-up reel 7 are located within cassette housing 2, and a magnetic tape 9 is wound about reels 6 and 7 and extends therebetween. A cut-out portion 8 is provided at the front of cassette housing 2, and magnetic tape 9 extends from supply reel 6 about a tape guide 10a and then through an opening 11a to the exterior of housing 2 at one side of cut-out 8. From opening 11a, tape 9 extends across cut-out 8 past the front surface of a tape positioning member 12 located at the center of cut-out 8 and formed so as to position tape 9 between member 12 and cover or lid 5 when the latter is in its closed position. After extending across cut-out 8, magnetic tape 9 extends into housing 2 through an opening 11b at the side of cut-out 8 remote from opening 11a, whereupon the tape passes through a tape guide 10b and is wound on take-up reel 7. The upper housing portion 4 is conventionally formed with a rectangular transparent window 13 through which the amounts of tape 9 wound on reels 6 and 7, respectively, can be observed. Leaf springs 14 are mounted, at one end, at the underside of upper housing portion 4 and are engageable at their free ends, with central nipples 6b and 7b at the tops of supply reel 6 and take-up reel 7, respectively, for urging such reels toward lower housing portion 3. Thus, when tape cassette 1 is not in use, springs 14 maintain reels 6 and 7 against the bottom of housing 2, as particularly shown on FIG. 3, so as to ensure that an annular depending rim provided at the bottom of each of the reels, for example, as indicated at 6a in the case of the supply reel 6 on FIG. 3, remains loosely within a corresponding circular hole 3a in lower housing portion 3 for rotatably positioning the respective reel within the cassette housing.

When tape cassette 1 is loaded onto a video tape recorder (not shown) and operatively positioned, cover or lid 5 is opened, reels 6 and 7 are engaged by respective reel support spindles and thereby slightly lifted from the bottom of cassette housing against the force of leaf springs 14, magnetic tape 9 is drawn out of housing 2 and loaded about a guide drum, and then recording and/or reproducing of video or other signals is effected on the tape 9 by means of rotary magnetic heads associated with such guide drum.

In the illustrated tape cassette 1 according to the prior art, each of leaf springs 14 is fixed within housing 2 by means of a thermoplastic pin 15 depending from the undersurface of upper housing portion 4 and extending through a respective hole 14a formed in the mounted end portion of the leaf spring. After being extended through the respective hole 14a, the tip or free end portion of each pin 15 is heated or otherwise softened and then pressed or squeezed to form a laterally enlarged head 15a (FIG. 4) against the leaf spring 14 by which the latter is retained on the respective pin 15.

However, since the surfaces of each leaf spring 14 are relatively smooth, after the head 15a has been formed or molded on pin 15 for holding the leaf spring 14 thereon, there is the danger that the leaf spring may turn or wobble about the respective pin 15 and thereby risk disturbance of the desired secure engagement of the free end of the spring 14 with a nipple at the center of the top of the respective reel.

OBJECTS AND SUMMARY OF THE INVENTION

Accordingly, it is an object of this invention to provide a tape cassette of the described type with an improved attachment of each leaf spring to the cassette housing.

More specifically, it is an object of this invention to provide a tape cassette, as aforesaid, in which turning or wobbling of each leaf spring about the headed mounting pin is avoided.

In accordance with an aspect of the present invention, in a tape cassette comprising supply and take-up reels having a tape wound thereon and extending between the reels, a cassette housing containing the reels and including upper and lower portions with the lower portion having means cooperatively engageable with the reels for rotatably positioning the latter within the housing, leaf spring means for urging the reels toward the lower housing portion, and means for mounting the leaf spring means in respect to the upper housing portion including hole means in the leaf spring means and pin means depending from the upper housing portion through the hole means and being headed for retaining the leaf spring means thereon; the leaf spring means includes a surface portion adjacent the hole means having fine convex and concave irregularities and being engaged by the headed pin means to securely hold the leaf spring means against turning and wobbling about the pin means.

Preferably, the pin means is of a thermoplastic material so that, when the same is softened in the course of being headed, the resulting formed head flows into, and intimately conforms to the fine convex and concave irregularities of the surface portion adjacent the hole means.

The above, and other objects, features and advantages of the invention, will become apparent from the following detailed description of preferred embodiments thereof when read in conjunction with the accompanying drawings, in which corresponding parts and elements are identified by the same reference numerals in the several views.

DESCRIPTION OF THE PREFERRED EMBODIMENTS

Figure 1:
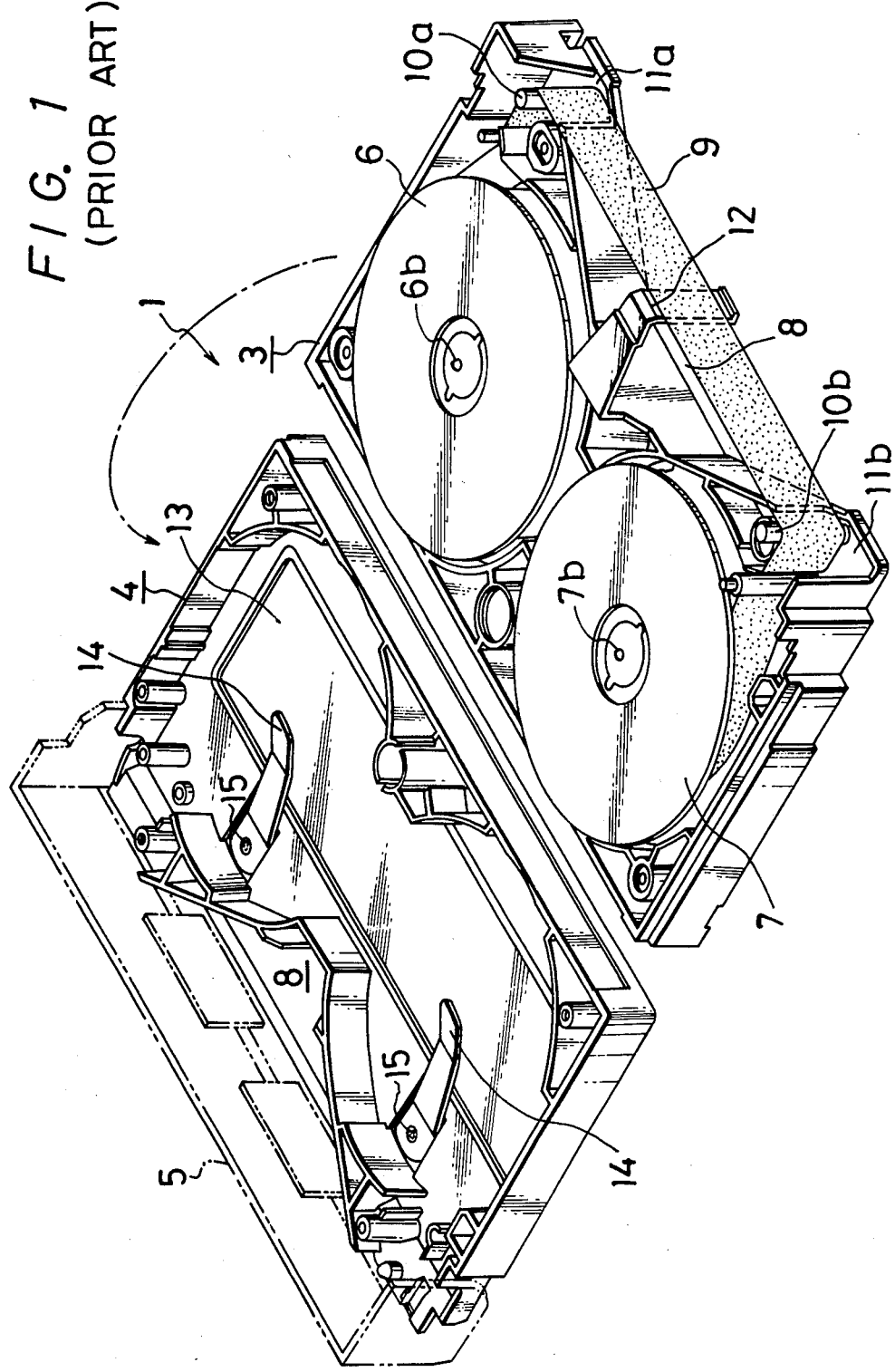
FIG. 1 is an exploded perspective view of a tape cassette according to the prior art.
Figure 2:
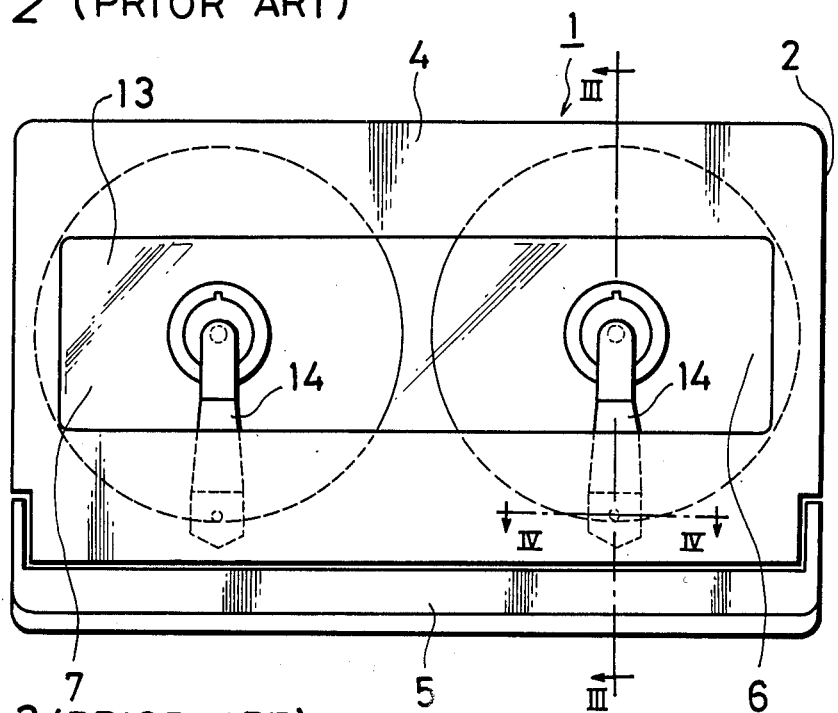
FIG. 2 is a top plan view of the tape cassette shown in FIG. 1.
Figure 3:
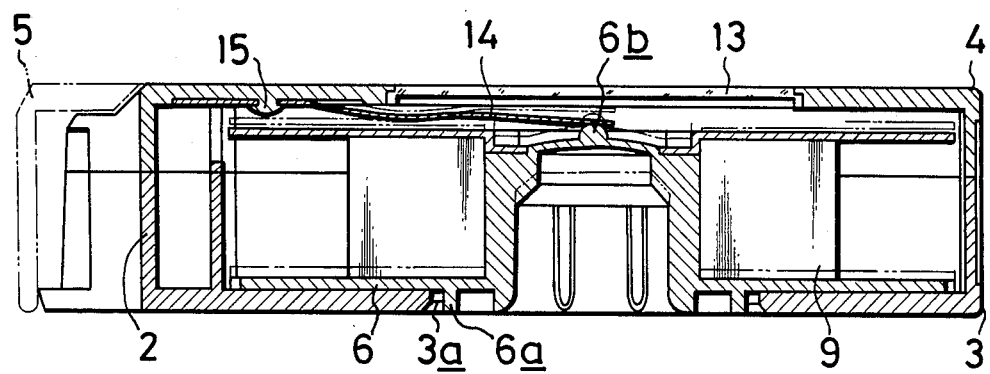
FIG. 3 is an enlarged sectional view taken along the line III—III on FIG. 2.
Figure 4:
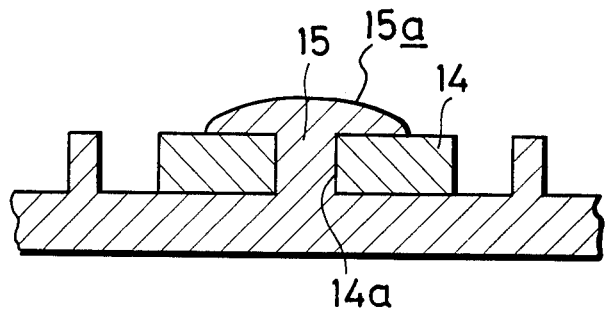
FIG. 4 is a fragmentary, further enlarged sectional view taken along the line IV—IV on FIG. 2, and showing details of the attachment of a leaf spring to the cassette housing in the tape cassette according to the prior art.
Figure 5:
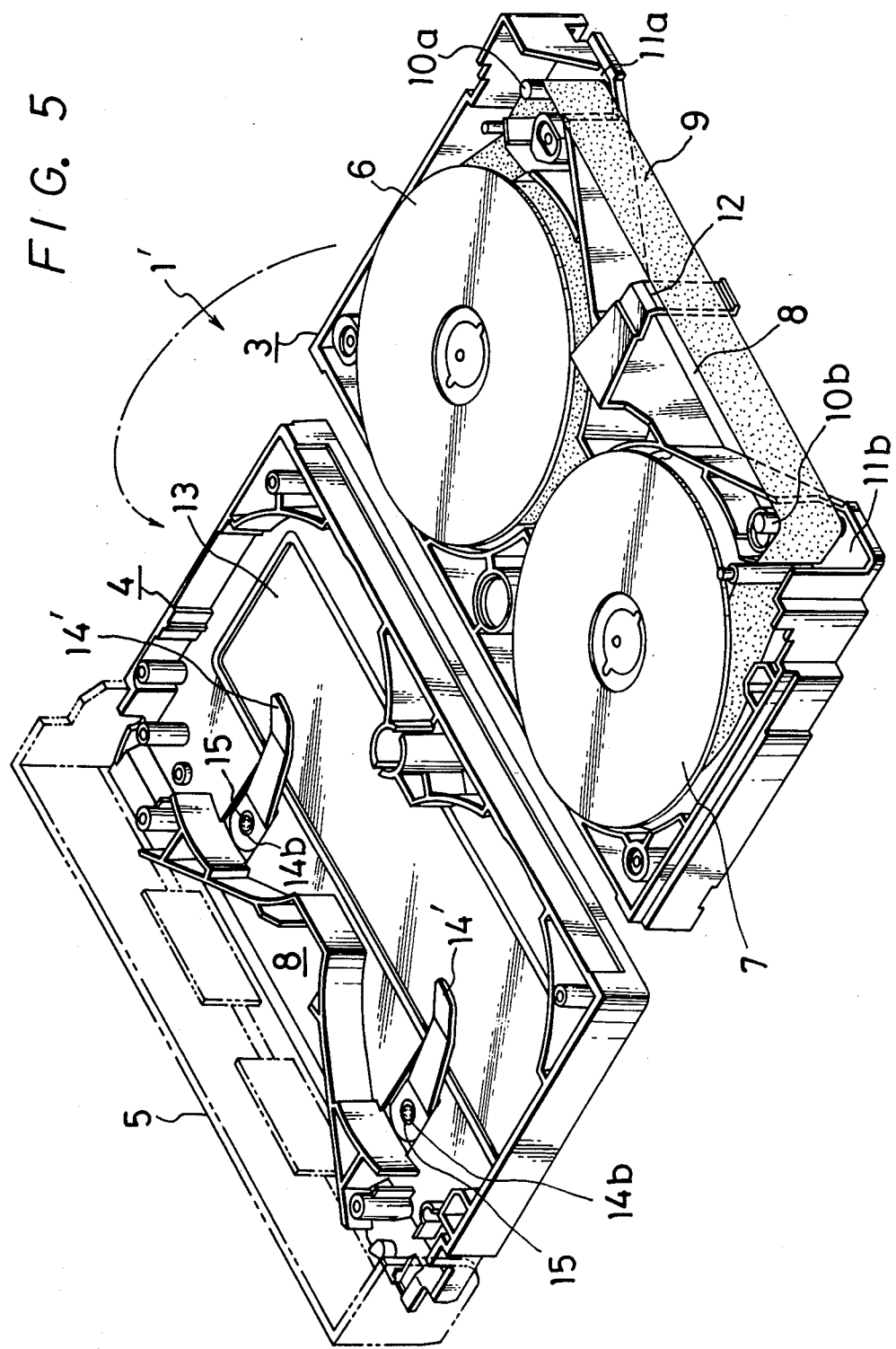
FIG. 5 is an exploded perspective view similar to that of FIG. 1, but showing a tape cassette according to a first embodiment of the present invention.
Figure 6:
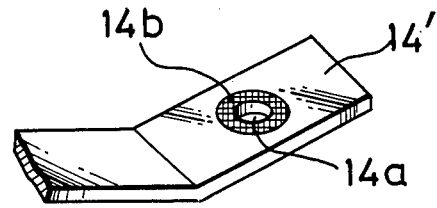
FIG. 6 is a fragmentary perspective view showing a portion of a leaf spring included in the tape cassette of FIG. 5.
Figure 7:
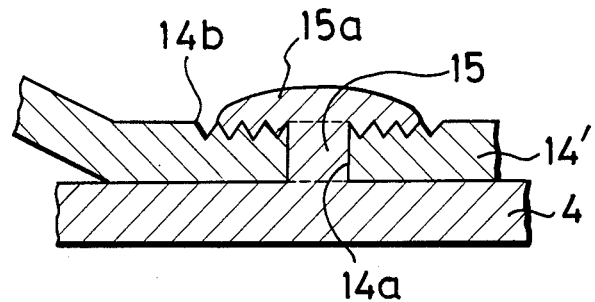
FIG. 7 is a fragmentary enlarged sectional view illustrating the attachment of a leaf spring to the cassette housing in a tape cassette according to the first embodiment of the invention illustrated.

Referring in detail to FIGS. 5, 6 and 7, it will be seen that the parts and elements of a tape cassette 1' according to an embodiment of this invention which correspond to those described above with reference to FIGS. 1–4 are identified by the same reference numerals. Once again, each of the leaf springs 14' for urging reels 6 and 7 toward lower housing portion 3 is secured, at its mounting end portion, to the underside of upper housing portion 4 by means of a headed pin 15. However, as shown particularly on FIGS. 6 and 7, in accordance with the invention, each leaf spring 14' has a surface portion 14b adjacent the respective hole 14a which is formed with relatively fine convex and concave irregularities. Such fine convex and concave irregularities in surface portion 14b can be formed by a rasp, roulette or the like, or may be pressed into surface portion 14b by providing a suitable configuration of the die used in punching or otherwise forming the respective leaf spring 14', in which case no additional steps are required in the production process.

As in the above-described tape cassette 1 according to the prior art, each leaf spring 14' is secured to the underside of upper housing portion 4 by a respective thermoplastic pin 15 depending from housing portion 4 and inserted into hole 14a of the leaf spring 14', whereupon the free end or tip of pin 15 is heated and pressed so as to form the head 15a. However, since surface portion 14b having the fine convex and concave irregularities is formed adjacent hole 14a on the face of the leaf spring directed away from upper housing portion 4, the head 15a formed on pin 15 extends over surface portion 14b and intimately conforms to the fine convex and concave irregularities thereof, as particularly shown on FIG. 7. In other words, when heating and pressing pin 15 for forming the head 15a thereon, the softened thermoplastic material of the pin flows into and meshes with the irregularities of surface portion 14b with the result that, when the headed pin 15 has set, turning or wobbling of the leaf spring 14' about pin 15 is positively and securely prevented.

It will be seen that, in the embodiment of the invention shown on FIGS. 6 and 7, the surface portion 14b having fine convex and concave irregularities surrounds hole 14a so as to be engaged by head 15a of the respective pin 15 over the entire extent of such head. However, the surface portion formed with fine convex and concave irregularities may be otherwise disposed adjacent the hole 14a so long as it is engaged by the head 15a on the respective pin 15 when such head is molded or pressed.

Figure 8:
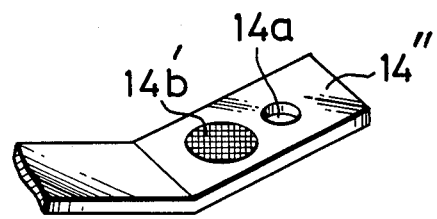
FIG. 8 is a fragmentary perspective view similar to that of FIG. 6 but illustrating another embodiment of the present invention.
Figure 9:
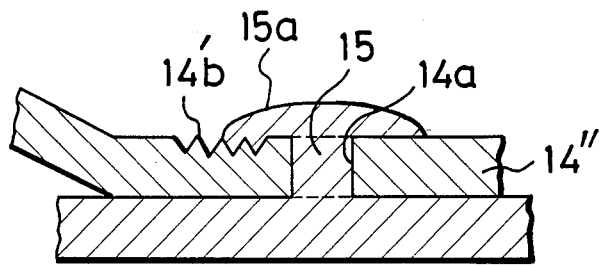
FIG. 9 is an enlarged fragmentary sectional view similar to that of FIG. 7, but showing the attachment of the leaf spring of FIG. 8 to the cassette housing.

For example, as shown on FIGS. 8 and 9, each leaf spring 14" may, in accordance with another embodiment of this invention, be formed with a surface portion 14'b having fine convex and concave irregularities which is adjacent to, but spaced a small distance from hole 14a in the respective leaf spring. Thus, when pin 15 is extended through hole 14a of leaf spring 14" and has its tip or free end heated and pressed so as to soften the thermoplastic material of pin 15 and form a head 15a thereon, such head again extends over and intimately conforms to the fine convex and concave irregularities of surface portion 14'b, as particularly shown on FIG. 9. Therefore, once again, each leaf spring 14" is locked or secured against turning or wobbling about the respective mounting pin 15.

It will be apparent that the location on each leaf spring of the surface portion having fine convex and concave irregularities is not limited to the locations described above with reference to FIGS. 6 and 8, respectively, so long as such surface portion is positioned to be at least partly overlapped by the head formed or molded on the respective mounting pin. Further, the surface portion having fine convex and concave irregularities may be formed on the face of each leaf spring 14' or 14" which is directed toward the upper housing portion 4, as well as on the face of the leaf spring directed away from such upper housing portion, as shown on FIGS. 6 and 8. In such case, the fine convex and concave irregularities facing toward, and bearing against the surface of upper housing portion 4 will further enhance the resistance to turning or wobbling of the leaf spring about its mounting pin.

Although illustrative embodiments of the present invention have been described in detail herein with reference to the accompanying drawings, it is to be understood that the invention is not limited to those precise embodiments, and that various modifications and changes may be effected therein by one skilled in the art without departing from the spirit or scope of the invention as defined by the appended claims.

What is claimed is:

1. In a tape cassette comprising supply and take-up reels having a tape wound thereon and extending between said reels, a cassette housing containing said reels and including upper and lower portions with said lower portion having means comparatively engageable with said reels for rotatably positioning the latter within said housing, metal leaf spring means having resilient arms engageable at free ends with said supply and take-up reels, respectively, for urging said reels toward said lower housing portion, and means for mounting said leaf spring means in respect to said upper housing portion including at least one hole in said leaf spring means remote from said free ends of the resilient arms and a thermoplastic pin depending from said upper housing portion through each said hole and being thereafter formed by heat and pressure into a head for retaining said leaf spring means thereon; the improvement of said leaf spring means including a mounting portion having parallel opposed surfaces with said hole extending therethrough, and with the one of said surfaces of the leaf spring means facing away from said upper housing portion having a surface portion adjacent said hole which is preformed to have fine convex and concave irregularities that extend along substantially cross-hatched lines so as to diverge, at least in part, from circles concentric with said hole and are engaged by said head formed by heat and pressure on the pin for providing the formed head with complementary fine concave and convex irregularities which similarly extend along cross-hatched lines and interlock with said concave and convex irregularities, respectively of said surface portion to securely hold said leaf spring means and preclude turning and wobbling about said pin.

2. A tape cassette according to claim 1; in which said leaf spring means includes a pair of leaf springs engaging said supply and take-up reels, respectively, and each having one said hole in a respective said mounting portion to receive a respective one of a pair of headed pins depending from a surface of said upper housing portion.

3. A tape cassette according to claim 2; in which said hole of each of said leaf springs opens within, and is surrounded by said surface portion having fine convex and concave irregularities.

4. A tape cassette according to claim 2; in which said surface portion having fine convex and concave irregularities is spaced from said hole in the respective leaf spring so that the respective headed pin intimately engages said irregularities beyond said hole.

* * * * *